United States Patent Office 2,923,424
Patented Feb. 2, 1960

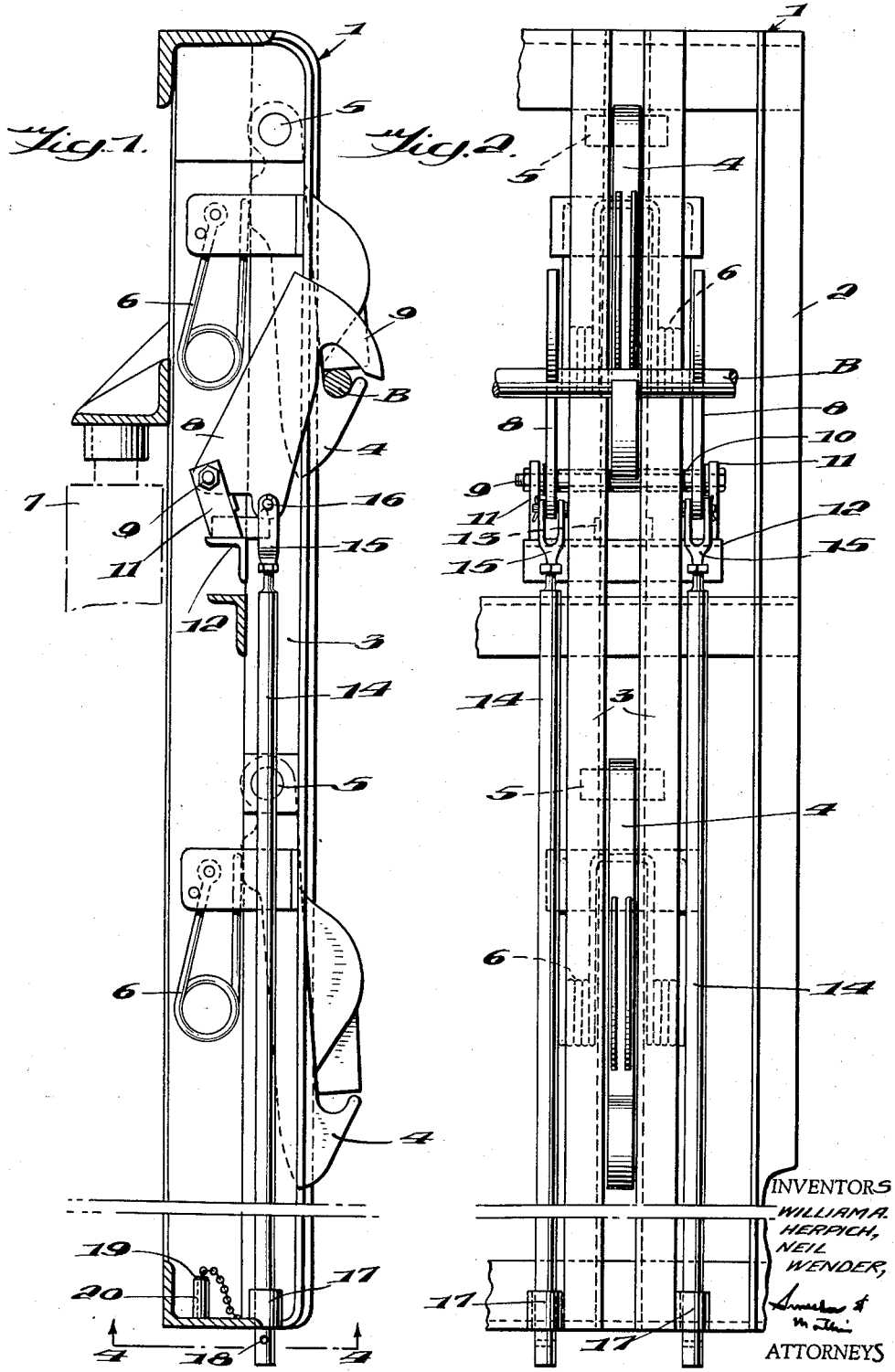

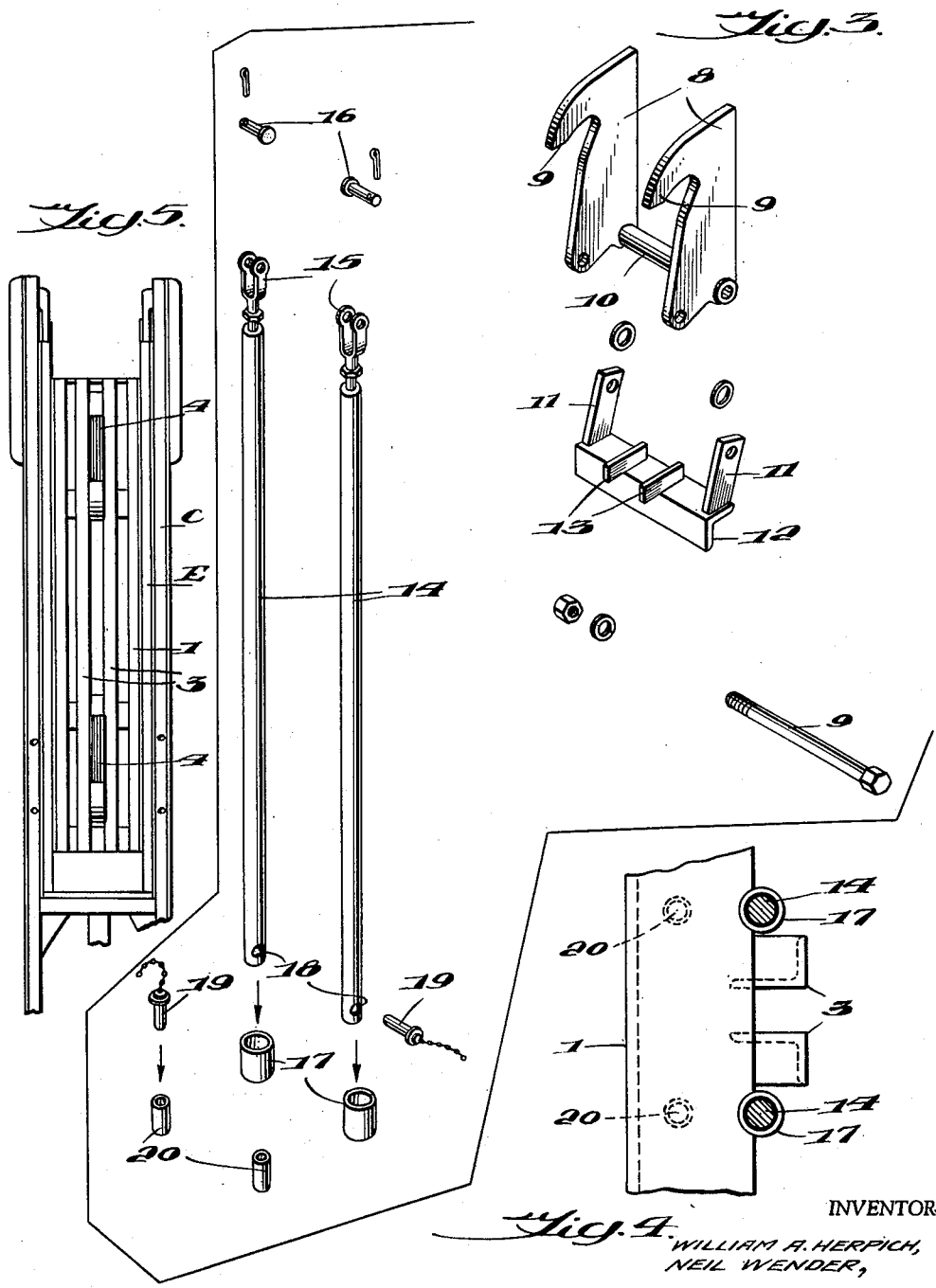

2,923,424

AUTOMATIC SAFETY LATCHES

William A. Herpich and Neil Wender, Knoxville, Tenn., assignors to Dempster Brothers, Inc., Knoxville, Tenn., a corporation of Tennessee Application January 9, 1957, Serial No. 633,236

8 Claims. (Cl. 214—317)

This invention relates to improvements in automatic safety latches for use on dumping hooks of transporting and dumping equipment, such as that disclosed in the patent of George R. Dempster, et al., No. 2,751,100, June 19, 1956.

In such transporting and dumping equipment, a container is raised by a hoisting unit on a skid frame and is provided with a bail connected with the container for engagement with an automatic hook on the skid frame to facilitate dumping of the container either by tipping over the container bodily or lowering the drop bottom door with respect thereto. Frequently, the containers are loaded improperly or the load is centered toward one side or the other, and in either event, shifting of the container may occur on the skid frame during the dumping operation. As a result of such shifting of the container or its tipping over, accidentally or otherwise, the bail may be lifted out of the dumping hook before the operator is ready for disengagement of the container therefrom. Inasmuch as the container is often dumped in a high position, this may result in serious damage to equipment or injury to operators or others.

Automatic safety hooks have been proposed heretofore, but these have not proven entirely satisfactory for all types of containers, especially for tilt-type containers when handled on transporting and dumping equipment of the character set forth in the aforesaid Dempster patent, No. 2,751,100, in which the hook is mounted on a telescopic section of the skid frame for upward and downward movement with respect thereto.

One object of this invention is to overcome the foregoing objections by providing a safety latch which will insure of fastening the bail in the hook when the telescopic section is raised for dumping of the container.

Another object of the invention is to improve the construction of the automatic hook of a hoisting and dumping unit by providing a safety latch on the movable telescopic section on which the hook is mounted, to retain the container bail effectively in the hook during dumping of the container.

Still another object of the invention is to provide an automatic safety latch which is operated during raising movement of the telescopic section on which the hook is mounted, and thereby to insure of positive and effective retaining of the bail of the container in the hook throughout the dumping operation and to release the safety latch automatically upon lowering of the telescopic section following the dumping action.

These objects may be accomplished, according to one embodiment of this invention, by providing a safety latch on the telescopic section of the transporting and dumping equipment adjacent the dumping hook, in position for engaging over the bail of the container in the hook. The latch is pivotally mounted on a fulcrum bracket on the telescopic section and is provided with a counterweight extending downwardly to the lower end of the telescopic section, to be actuated upon lowering of the telescopic section by abutment against a connected portion of the carriage. The counterweight will assure of closing of the safety latch over the bail in the hook whenever the telescopic section is raised for dumping action and will maintain such latch in place thereon throughout the dumping operation. However, upon completion of the dumping operation and the lowering of the telescopic section to its normal position with respect to the carriage, the counterweight will be engaged with the latter so as to raise the safety latch automatically from its retained position over the bail of the container.

This embodiment is illustrated in the accompanying drawings, in which:

Fig. 1 is a vertical sectional view, partly in elevation, through the telescopic section of the equipment;

Fig. 2 is a rear elevation thereof;

Fig. 3 is a disassembled perspective view of the automatic safety latch assembly;

Fig. 4 is a bottom plan view, partly in section, of the telescopic section frame structure, on the line 4—4 in Fig. 1; and Fig. 5 is an elevational view of a skid frame assembly to which the invention may be applied.

The invention is shown as applied to transporting and dumping equipment of the type set forth in the aforesaid Dempster et al. patent, No. 2,751,100. Such equipment includes a carriage C (Fig. 5) mounted on a vehicle, provided with an elevator E and skid frame structure upon which a container is to be elevated for transportation and for dumping. The container is usually provided with a bail B (Fig. 1) for engaging and holding the container on the transporting equipment during dumping. The bail is usually engaged by an automatic hook, one or more of which hooks may be mounted on a telescopic section 1 of the elevator E on the carriage C as set forth in said patent.

In the present embodiment of the invention, this is illustrated as applied to the telescopic section of transporting equipment of the character described, although it is recognized to be applicable to many other types of transporting equipment and is not to be restricted to the specific form set forth in the aforesaid Dempster et al. patent, No. 2,751,100, nor even to that type of equipment.

The telescopic section 1 comprises a rectangular frame structure, generally indicated at 2, adapted to be mounted within the frame of the carriage or within the elevator structure E provided thereon, according to the example shown in the aforesaid Dempster et al. patent, No. 2,751,100. Mounted within the frame 2 are hook guide angle bars 3 spaced apart transversely, as shown in Fig. 2, to receive and mount one or more automatic hooks 4 therein. Two such hooks are illustrated at 4, spaced apart vertically of the length of the telescopic section 1. Each of the hooks 4 is pivotally supported at 5 between the spaced bars 3. These hooks are adapted to engage the bail, indicated at B, of the container and thereby to retain the body of the container on the carriage C during the dumping action. A spring 6 is connected with each of the hooks 4, normally tending to project the hooks into the path of the bail B. The form of automatic hooks illustrated is substantially the same as set forth in the Dempster patent, No. 2,404,830, July 30, 1946.

The telescopic section 1 may be moved upward and downward relative to the elevator E, by one or more hydraulic cylinders 7 connected therewith.

When dumping some types of the containers, such, for example, as the tilt-type container, with dumping equipment in which the telescopic section carries the hook or hooks and is moved upward with respect to the carriage, it has been found that the bail will occasionally come out of the dumping hook too soon.

We have provided a safety latch, generally indicated at 8, extending upward on each opposite side of the hook 4 and having a downwardly turned hook portion 9 arranged in opposed relation to the throat of the automatic hook 4 in which the bail B is received. The latches 8 on opposite sides of the hook 4 extend downwardly from the lower end portion of the automatic hook and are pivotally supported at their lower ends within the telescopic section and mounted thereon.

In this embodiment of the invention, the pivotal mounting means for the latches 8 comprises a cross rod or pivot bolt 9 extending through a sleeve 10, which may be welded or otherwise secured rigidly to the latches 8 or be interposed therebetween for holding these properly spaced apart. The bolt 9 extends loosely through the sleeve 10 so as to form a journal support therefor and for the latches 8.

The opposite ends of the bolt 9 are mounted in a fulcrum bracket assembly including a pair of upright bars 11 supported on opposite ends of an angle bar 12. The angle bar 12 is in abutting relation with the back edges of the spaced bars 3. The bar 12 is braced by horizontally extending bars 13 that encompass the inside legs of the hook guide angle bars 3. These parts may be welded or otherwise secured rigidly together, and serve to provide a secure and effective mounting for the latches 8.

Extending downwardly from the respective latches 8 are rods 14 which form counterweights for the respective latches. Each of the rods 14 is connected with the adjacent latch 8 by a clevis 15 and pin 16 pivotally connecting the clevis with the latch.

At their lower ends, the counterweight rods 14 extend downward through guide sleeves 17 secured to the lower end of the telescopic section 1. The rods 14 should extend through the sleeves 17 when the latches 8 are closed over the throat of the hook, as illustrated in Fig. 1. The extreme end of each rod 15 is provided with a hole 18 therein, adapted to receive a pin 19 normally retained in a holder 20 on the frame 2, but capable of being disengaged therefrom and being inserted into the hole 18 when it is desired to retain the latch 8 in an inoperative position.

Not all types of containers will require the use of the safety latches 8. When these are not needed, they may be rendered ineffective by being moved back to their released positions, which will raise the rods 14 sufficiently to expose the holes 18 above the sleeves 17. Upon insertion of the pins 19 in the holes above the sleeves 17, the latches 8 will be held in their retracted positions, where they will be ineffective. When the latches are needed, however, the latter are operated in response to the weight of the rods 14 sliding vertically in the sleeve 17.

When the telescopic section 1 is lowered to its lowermost position in the elevator E (Fig. 5) during the normal operation of the transporting and dumping equipment, the lower ends of the counterweight rods 14 will engage a cross member on the elevator E in the carriage C, and thereby push the rods upward, automatically retracting the latches 8 out of the path of the bail B of the container. This is the position of the telescopic section during engagement of the container by the hook 4. This engagement occurs usually just before it is desired to dump the container, when the bail is to be engaged for holding the body portion of the container during the dumping action.

With the type of dumping equipment wherein the hook 4 is mounted on a telescopic section of the carriage, after engagement of the bail by the hook 4, the telescopic section 1 is raised relative to the carriage by the hydraulic cylinder 7. This raising movement will allow the counterweight action of the rods 14 to move the latches 8 to their retained positions over the bail B in the hook 4, as shown in Fig. 1, and thus effectively secure the bail against accidental release from the throat of the hook during the dumping action. The hook portion 9 on the latch 8, acting under the influence of each rod 14, will be sufficient to insure of retaining the bail in the hook, so long as the telescopic section 1 is in raised position with respect to the elevator and the carriage.

After the dumping action has been completed, the telescopic section 1 is lowered in the carriage to its lowermost position (Fig. 5). When it reaches such lowermost position, the lower ends of the rods 14 abut against a cross member on the carriage and thereby raise the rods to swing the latches 8 on their pivot bolt 9, to retracted positions away from the throat of the hook 4, thereby disengaging the bail B and releasing it for separation from the automatic hook.

This provides an effective automatic safety latch for retaining the bail in the automatic hook whenever the telescopic section is raised during the dumping action. It functions automatically, without requiring any power means to be connected therewith, responding only to the position of the telescopic section with respect to the carriage, and is released automatically when the telescopic section is returned to its normal position.

The construction is extremely simple and does not occupy material space on the telescopic section, but may be added thereto at little expense. Nevertheless, it achieves a material safety factor that is important in the effective handling and dumping of containers on this type of equipment.

While the invention has been illustrated and described in one embodiment, it is recognized that variations and changes may be made therein without departing from the invention, as set forth in the claims.

We claim:

1. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, means mounting the safety latch on the skid frame section for movement to operative and inoperaitve positions with respect to the hook, counterweight means connected with the safety latch and extending downwardly therefrom normally tending to move the latch to an operative position over the hook, and means for imparting a pushing action to the counterweight means for opening the safety latch relative to the hook.

2. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, means mounting the safety latch on the section for movement to operative and inoperative positions with respect to the hook, and a counterweight rod connected with the safety latch and extending downwardly therefrom for actuating the latch and moving the latter to said operative position over the hook.

3. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, means mounting the safety latch on the section for movement to operative and inoperative positions with respect to the hook for retaining and releasing the bail with respect thereto, and a counterweight rod operatively connected with the latch and extending downwardly to the lower end of the section for operating the latch, said counterweight rod having an end portion projecting at said lower end of the section in position for engagement by a fixed abutment on the skid frame when the section is moved downwardly, to disengage the safety latch from the bail.

4. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, means pivotally mounting the safety latch on the skid frame section for movement to operative and inoperative positions with respect to the hook for retaining and releasing the bail relative thereto, a counterweight rod pivotally connected with the safety latch and extending downwardly therefrom through the lower end portion of the section with a projecting lower end in position to be engaged by a fixed abutment on the skid frame to release the latch from its operative position over the bail.

5. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, a fulcrum bracket mounted on the section, means pivotally mounting the lower end portion of the safety hook on the fulcrum bracket, and a counterweight rod pivotally connected with the lower end portion of the safety latch and extending downwardly through the lower end portion of the skid frame section, said counterweight rod having the lower end thereof projecting from the lower end of the section in position for engagement by an abutment when the section is moved to its lowermost position.

6. In transporting equipment of the character described, a skid frame section, an automatic hook mounted in the skid frame section in position to engage a portion of a container, a pair of safety latches on opposite sides of the hook, means pivotally mounting the safety latches on the section for swinging movement to operative and inoperative positions with respect to the hook, counterweight means connected with the safety latches normally tending to move said latches to operative positions, and means for imparting a pushing action to the counterweight means for opening the safety latch relative to the hook.

7. In transporting equipment of the character described, a skid frame section, an automatic hook mounted in the skid frame section in position to engage a portion of a container, a pair of safety latches on opposite sides of the hook, means pivotally mounting the safety latches on the section for swinging movement to operative and inoperative positions with respect to the hook, and counterweight rods connected with the safety latches and extending downwardly through the lower end portion of the section with the lower ends of said rods projecting therefrom for operative engagement to release the safety latches.

8. In transporting equipment of the character described having an upright skid frame for movement of a container therealong with a bail on the container, the combination of a skid frame section having a hook thereon in position to receive the bail and to retain the container on the skid frame for dumping, a safety latch having a hook portion in overlapping relation with the hook, means pivotally mounting the safety latch on the skid frame section about an axis located appreciably below the hook for swinging movement to operative and inoperative positions with respect to the hook, and counterweight means connected with the safety latch normally tending to move the latch to a locked position over the hook and holding the same locked relative thereto against removal by lifting of the bail in the hook, said counterweight means extending downwardly through the lower end of the skid frame section for engagement from below said section when said section reaches an extreme lowered position.

References Cited in the file of this patent

UNITED STATES PATENTS

| 2,325,568 | Eaton | July 27, 1943 |
| 2,729,496 | Jones | Jan. 3, 1956 |